United States Patent
Magnusson et al.

(10) Patent No.: US 8,010,150 B2
(45) Date of Patent: Aug. 30, 2011

(54) TECHNIQUE FOR NEGOTIATING ON BEHALF OF A MOBILE AMBIENT NETWORK WITHIN A MULTI-OPERATOR WIRELESS COMMUNICATION SYSTEM

(75) Inventors: Per Magnusson, Linkoping (SE); Joachim Sachs, Aachen (DE); Johan Lundsjo, Spanga (SE); Mikael Prytz, Ronninge (SE); Andreas Schieder, Wurselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 819 days.

(21) Appl. No.: 11/917,078

(22) PCT Filed: Jun. 29, 2005

(86) PCT No.: PCT/EP2005/007021
§ 371 (c)(1), (2), (4) Date: Jan. 9, 2008

(87) PCT Pub. No.: WO2007/000181
PCT Pub. Date: Jan. 4, 2007

(65) Prior Publication Data
US 2008/0198822 A1  Aug. 21, 2008

(51) Int. Cl.
*H04W 4/24* (2009.01)
*H04W 28/18* (2009.01)
*H04W 88/06* (2009.01)

(52) U.S. Cl. .............. 455/552.1; 455/406; 455/432.3
(58) Field of Classification Search .............. None
See application file for complete search history.

(56) References Cited

U.S. PATENT DOCUMENTS

| | | | | |
|---|---|---|---|---|
| 6,434,380 | B1 * | 8/2002 | Andersson et al. | 455/406 |
| 7,734,295 | B2 * | 6/2010 | Chang | 455/445 |
| 2004/0198360 | A1 * | 10/2004 | Kotzin | 455/445 |
| 2005/0059397 | A1 * | 3/2005 | Zhao | 455/435.2 |
| 2006/0068783 | A1 * | 3/2006 | Arduini et al. | 455/435.1 |

OTHER PUBLICATIONS

Gustafsson E et al: "Always Best Connected" IEEE Wireless Communications. IEEE Service Center, Piscataway, NJ, US, vol. 10, No. 1, Feb. 2003 (2203-02), pp. 49-55, XP001144621 ISSN: 1536-1284.

* cited by examiner

*Primary Examiner* — Philip Sobutka (57) ABSTRACT

A mobile ambient network (MAN) negotiator 106 is provided for negotiating with ambient access networks (AANs) 102 on behalf of a MAN 104 to select a particular AAN to handle a wireless communication session for the MAN. The MAN is, e.g., either a user terminal (UT) or a private area network (PAN). The negotiations performed by the MAN negotiator on behalf of the MAN include establishing a secure, trusted relationship between the MAN and the AAN, as well as negotiating costs, billing arrangements and the like. The MAN negotiator communicates with the MAN via a dedicated wireless communication channel but preferably communicates with the AANs via non-wireless, i.e. fixed, connections.

12 Claims, 4 Drawing Sheets

TECHNIQUE FOR NEGOTIATING ON BEHALF OF A MOBILE AMBIENT NETWORK WITHIN A MULTI-OPERATOR WIRELESS COMMUNICATION SYSTEM

FIELD OF THE INVENTION

The invention generally relates to wireless communication systems and in particular to a technique for negotiating on behalf of a mobile ambient network within a multi-operator wireless communication system.

BACKGROUND OF THE INVENTION

An ambient network is a digital environment that is sensitive, adaptive, and responsive to the presence of people. In the context of wireless communications, an ambient network is a communication network that automatically responds and adapts to the needs of each particular user, such as the user of a mobile terminal (e.g. mobile telephone or mobile-equipped laptop computer) or a private area network (PAN). As one example, if a user switches a mobile telephone call from voice to video transmission, the ambient network automatically detects the switch, identifies the optimal wireless communication network for handling the video transmission based on the current location of the user, and then switches communication technology on behalf of user so as to improve bandwidth or reduce cost. For instance, the ambient network may automatically switch among wireless technologies such as Global System for Mobile Communications (GSM) technologies, Universal Mobile Telecommunications Systems (UMTS) employing wideband code-division multiple access (WCDMA) technologies, Super Third Generation (S3G) technologies, Wide Local Area Network (WLAN) technologies, BlueTooth technologies and Worldwide Interoperability for Microwave Access (WiMAX) technologies. As another example, if the user wishes to print a document from a mobile-equipped laptop computer, the ambient network automatically identifies the nearest available printer and routes the document to that printer, converting the format if needed.

As a matter of terminology, individual user terminals or individual PANs are typically referred to as a Mobile Ambient Networks (MANs). Hence, it should be understood that the concept of the MAN includes individual user terminals, such as individual mobile telephones, and therefore the MAN is not limited to what is conventionally regarded as a network. The ambient communication networks that interact with the MANs to provide ambient access are typically referred to as Access Ambient Network (AANs). The AANs incorporate, or interface with, otherwise conventional Radio Access Technology (RAT) networks such as GSM, UMTS, etc. Ambient networks and related technologies are discussed in publicly available documents provided by the Ambient Networks organization, which is an integrated project co-sponsored by the European Commission under the Information Society Technology priority under the 6th Framework Programme. In particular, see Technical Annex to D3.2 "Connecting Ambient Networks-Architecture Protocol Design," (Document No. IST-2002-507134-AN/WP3/D3.2/TA, 31 Mar. 2004).

Significant problems arise when attempting to implement a true ambient network. In particular, a tremendous amount of signaling may be required between each user terminal or PAN and the ambient networks with which they communicate. This is particularly true if the user wishes to maintain some degree of control over the networks that are utilized. Conventionally, a user has an agreement with one particular operator/network and this operator negotiates on behalf of the user before handing over the user to a different operator. This is typically the case when roaming among the multiple networks. However, with ambient networks, it is anticipated that the user will have relations with many operator/networks and may wish to be more actively involved in the network access selection process. For example, the user may not trust any given operator to act in the best interests of the user or the user may wish to tailor the network selection process in a way that any single existing operator/network does not support. As a result, a substantial amount of "negotiation" signaling may be required between each MAN and the various AANs to accommodate and coordinate network selection on behalf of each MAN. The negotiation signaling may pertain, for example, to establishing trust, billing, and security relationships between the MAN and the AANs, including transference of Authentication, Authorization, Accounting (AAA) credentials. The negotiation signaling may also pertain to negotiations among different AANs or between a given AAN and otherwise conventional network operators of GSM, UMTS, etc., systems.

The negotiation signaling is in addition to the typical sort of handover signaling required to handover a mobile terminal from one network to another having a predetermined trust relationship. Accordingly, the additional negotiation signaling vastly increases the required bandwidth, particularly between the MANs and the AANs, which rely on wireless communication channels. Moreover, significant signaling delays can arise. In many cases, the available wireless communication bandwidth between the MANs and the various AANs is not sufficient to accommodate the additional negotiation signaling, and so it is simply not feasible to implement a true ambient network, at least not one allowing users to retain much control over network selection.

Hence, there is a significant need to provide improved techniques for handling negotiation signaling within ambient networks and it is to this end the invention is primarily directed.

SUMMARY OF THE INVENTION

In accordance with a system implementation of the invention, a network component is provided for use within a multi-operator wireless communication system having a plurality of wireless communication networks and at least one mobile ambient network. The network component comprises a MAN negotiator assigned to a particular MAN and operative to negotiate with one or more of the wireless communication networks on behalf of the MAN, wherein the MAN negotiator is controllable by the MAN via a dedicated control channel.

The assignment between a particular MAN and a particular MAN negotiator may be established in a separate assignment step. The assignment will often be non-statically, meaning that an assignment may be cancelled (e.g. upon a request of the MAN negotiator or the MAN) and a new assignment (e.g. to a new MAN negotiator) may be established. The establishment of an assignment may include the exchange of information required to establish a secure and/or trusted control channel or other communication link between the MAN negotiator and the MAN. Such information may comprise keys or any other credentials. A single MAN may be assigned to one or more MAN negotiators, and vice versa.

In one example, the MAN negotiator is operative to negotiate with wireless communication networks on behalf of the MAN to select a particular wireless communication network to handle a wireless communication session of the MAN and to enable the establishment of a wireless connection between the selected wireless communication network and the MAN. The MAN may include at least one user terminal or PAN and is operative to communicate with the MAN negotiator via at least one of a secure and trusted connection.

Preferably, the MAN negotiator is operative to communicate with the MAN via a wireless communication link and to communicate with the wireless communication networks via a non-wireless connection. In other words, negotiation signaling on behalf of the MAN is routed via non-wireless connections. This minimizes transmission delay times and avoids consuming wireless bandwidth. The non-wireless connection may include one or more of non-wireless Internet, fiber optic, cable, and the public switched telephone network (PSTN) connections. The wireless communication link may include one or more of GSM, UMTS, S3G, WLAN, BlueTooth or WiMAX connections.

Further, in the example, the MAN negotiator is operative to communicate with the wireless communication networks via an authenticated port using the non-wireless connection. In one specific implementation, the MAN negotiator is operative to authenticate the MAN with a wireless communication network using, preferably, a pre-stored AAA credential. The MAN negotiator may be operative to negotiate with a wireless communication network on behalf of the MAN with regard to one or more of trust establishment, security association establishment, and billing establishment, or one or more of service negotiations, compensation/billing negotiations and resource sharing negotiations. If an overlay network is provided, the MAN negotiator will be operative to negotiate with the overlay network on behalf of the MAN with regard to one or more of service requirements, preferences/policies of overlay nodes of the overlay networks, and capabilities of the MAN.

Preferably, the MAN negotiator is also operative to negotiate on behalf of the MAN with regard to mobility management procedures, such as performing mobile Internet protocol (IP) binding updates. The MAN negotiator is also preferably operative to pre-establish connections for the MAN with one or more AANs of the wireless communication network even prior to the MAN establishing a direct link to the AAN.

Depending upon the implementation, the MAN negotiator and the MAN form a single ambient network or a plurality of MAN negotiators are provided forming a negotiator ambient network.

In accordance with a method implementation of the invention, a method for use by a MAN negotiator component of a multi-operator wireless communication system is provided wherein the system has a plurality of wireless communication networks and at least one MAN. The method comprises the steps of: receiving commands via a dedicated channel from a MAN to which the MAN negotiator is assigned; and negotiating with one or more of the wireless communication networks on behalf of the MAN.

Preferably, the commands received from the MAN pertain to the selection of a wireless communication network to handle a wireless communication session of the MAN. The negotiating step may comprise negotiating with the wireless communication networks to select a particular wireless communication network to handle a wireless communication session of the MAN and to enable the establishment of a wireless connection between the selected wireless communication network and the MAN.

The invention can be implemented as a hardware solution or as a computer program product comprising program code portions for performing the steps of the invention when the computer program product is run on one or more computing devices. The computer program product may be stored on a data carrier in fixed association with or removable from the computing device(s).

BRIEF DESCRIPTION OF THE DRAWINGS

In the following, the invention will be described with reference to exemplary embodiments illustrated in the accompanying figures, in which.

DETAILED DESCRIPTION OF THE PREFERRED EMBODIMENTS

In the following description, for the purposes of explanation and not limitation, specific details are set forth to provide a thorough understanding of the invention. It will be apparent to one skilled in the art that the invention may be practiced in other embodiments that depart from these specific details. In particular, those skilled in the art will appreciate that the functions explained herein below may be implemented using individual hardware circuitry, using a software functioning in conjunction with a programmed microprocessor or general purpose computer, using an application specific integrated circuit (ASIC) and/or using one or more digital signal processors (DSPs).

Figure 1:
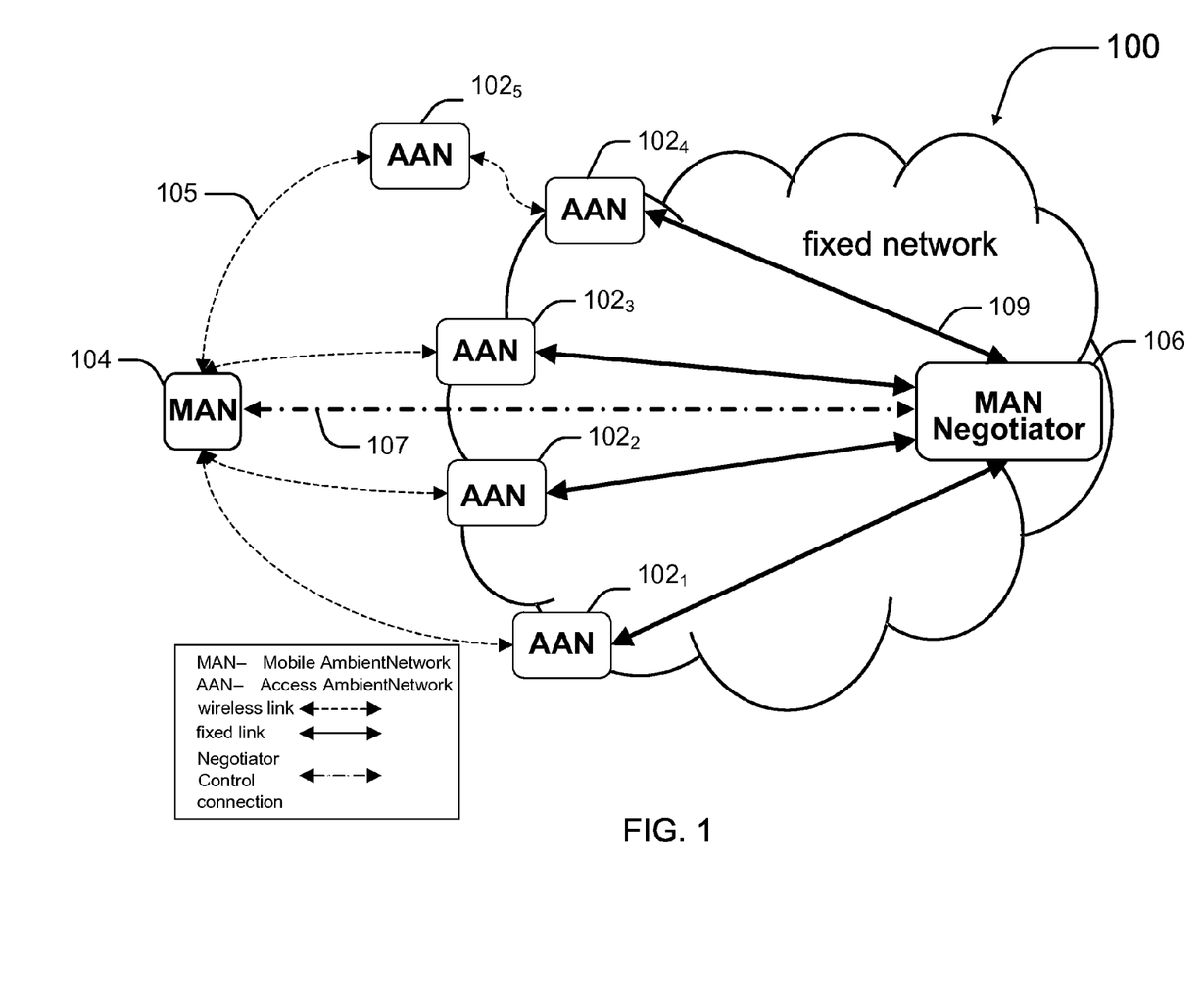
FIG. 1 illustrates an ambient network of a multi-radio mobile communication system wherein a MAN negotiator is provided for negotiating network selection among various AANs.

FIG. 1 illustrates a multi-radio communication network 100 incorporating a set of MANs $102_1$-$102_5$ interconnected via a fixed communication network. Individually and collectively, MANs 102 provide network access for various MANs, only one of which, MAN 104, is shown. As explained above, a MAN may be an individual user terminal, such as a mobile telephone or mobile-equipped laptop computer, or may be a PAN. When operating in the vicinity of MANs 102, the MANs 102 adaptively respond to the needs of the user of MAN 104 in accordance with ambient networking techniques, such as those described in the various publicly available documents provided by the Ambient Networks organization referred to above. Communication between MANs 102 and MAN 104 is performed on wireless communication channels 105 using any of a variety of wireless communication technologies associated with the AANs 102, such as GSM, UMTS, S3G, WLAN, BlueTooth, WiMAX connections. Communications among the various MANs 102, such as communications involved in roaming of a MAN from one MAN to another MAN, is preferably performed using non-wireless communication channels 109 such as the non-wireless Internet, fiber optic connections, cable connections, or PSTN connections. However, at least some of the MANs (in particular MAN $102_5$) may communicate with other MANs via wireless communication channels.

To facilitate the selection of a particular MAN 102 on behalf of MAN 104 and for the establishment of connections therebetween, a MAN negotiator 106 is provided, which is associated with the MAN. By associated, it is meant in the present embodiment that there is a logical relationship between MAN negotiator 106 and MAN 104, with at least one MAN negotiator 106 associated with the MAN 104. This logical relationship is discussed in greater detail below. Preferably, a given MAN 104 is associated with only one MAN negotiator 106. Though, in some implementations, multiple MAN negotiators 106 may instead be associated with a single MAN 104, e.g. configured to negotiate with particular types of AANs. Conversely, a given MAN negotiator 106 may be associated with numerous MANs 104 for negotiating on behalf of each of the MANs.

Communications between MAN 104 and MAN negotiator 106 are performed via a dedicated (physical or logical) negotiator control channel 107 implemented in the embodiment using a wireless communication link. By dedicated channel, it is meant here that the channel is substantially only used for negotiation-based signaling. It is not used for relaying voice or multimedia communications. Depending upon the location of the MAN 104, the dedicated channel 107 may need to be routed through the AAN 102 that the MAN 104 is currently connected to so signals from MAN negotiator 106 may be routed to MAN 104. The particular signals sent via the dedicated negotiator control channel are discussed below.

Communications between MAN negotiator 106 and the various AANs 102, however, are typically performed via one of the fixed, non-wireless communication channels 109, such as fiber optic connections, cable connections, or PSTN connections. (Though, for any AANs 102 not connected to the fixed network, at least a portion of the communication channel between the MAN negotiator 106 and the AAN 102 is via a wireless communication channel). Hence, minimal wireless communications bandwidth is required to accommodate negotiation communications between MAN negotiator 106 and the various AANs 102. As explained above, a substantial amount of negotiation signaling may be required within ambient networks, particularly if the user of the MAN 104 subject to the negotiations wishes to retain some control over the negotiation process. By providing MAN negotiator 106 with fixed communication links to the various AANs 102, minimal wireless bandwidth is consumed during the negotiation process and signaling delays that may arise during wireless communications are substantially avoided. Moreover, processing resources within the MAN 104 itself are conserved and may be redirected to other tasks.

Thus, MAN negotiator 106 is provided in the present embodiment for negotiating network selection on behalf of MAN 104 within the multi-radio wireless communication network 100. In general, MAN 104 and the MAN negotiator 106 have a pre-established relationship with a high level of trust, and MAN negotiator 106 can act on behalf of MAN 104. Depending upon the circumstances, this may require that MAN negotiator 106 be in possession of the credentials of MAN 104 (such as identities and security credentials), which are ordinarily not known outside of MAN 104 itself. Consequently, there is a logical connection or association between MAN 104 and MAN negotiator 106 with a high level of security based, for example, on pre-shared public/private keys. Preferably, this trust connection is substantially permanent or at least remains valid for a long period of time compared to the temporary connections established between MAN 104 and the various AANs 102. Thus, whereas individual communication sessions are established and disconnected frequently as MAN 104 roams within network 100, the association between MAN 104 and MAN negotiator 106 remains valid, perhaps for years.

Apart from the logical connection between MAN 104 and MAN negotiator 106, there is also the aforementioned negotiator control channel 107 allowing MAN 104 to instruct MAN negotiator 106 to perform actions on behalf of MAN 104. This connection is also utilized when MAN negotiator 106 reports back to MAN 104 regarding the results of any actions performed on behalf of MAN 104. In use, MAN 104 remotely controls MAN negotiator 106 via the negotiator control channel 107 by, for example, providing policies, preferences, etc. to the MAN negotiator 106 for use in negotiations with AANs 102. MAN 104 may also specify the order of specific tasks to be performed. Furthermore, MAN 104 may provide MAN negotiator 106 with measurements specifying service capabilities or other parameters that MAN 104 collects from surrounding AANs 102. Examples include AAN identifiers, cell IDs, position information, and the like. Depending upon the capabilities of MAN 104, position information may be obtained using a global positioning system (GPS).

When interfacing with the various AANs 102, MAN negotiator 106 acts as if it were the MAN 104 itself. Typically, MAN negotiator 106 and the various AANs 102 do not share any pre-existing trust relationship, as in conventional roaming scenarios, where the visited public land mobile network (PLMN) and the home PLMN share a roaming agreement. Accordingly, MAN negotiator 106 negotiates with selected AANs 102 to establish a trust relationship, at least valid for the duration of a communication session between MAN 104 and the particular AAN 102. Moreover, the MAN negotiator 106 is not assumed to take any liability for the content of any agreement or to have any stake in any business relation between MAN 104 and the AANs 102. Accordingly, the only nodes that appear as partners of a business relationship are MAN 104 and the various AANs 102.

Figure 2:
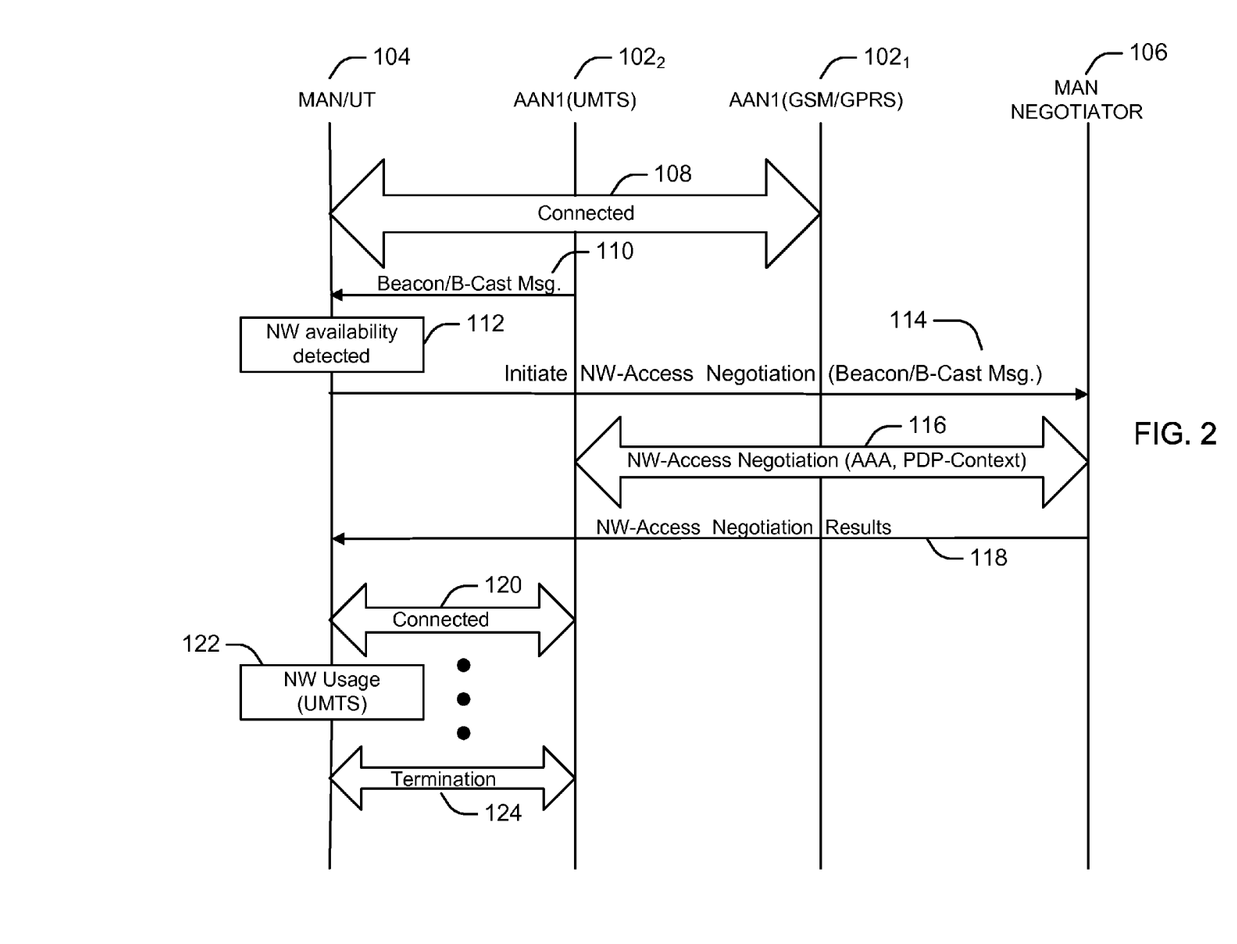
FIG. 2 is a diagram illustrating an exemplary sequence of signal transmission steps performed among selected components of FIG. 1 during a negotiation process.

FIG. 2 is a diagram illustrating an exemplary sequence of signal transmission steps performed among selected components of FIG. 1 during a network selection negotiation process. Initially, MAN 104 is connected to a first AAN 102$_1$ and signals are transmitted therebetween via wireless channels at step 108. In the example of FIG. 2, MAN 104 is a universal terminal (UT), whereas AAN 102$_1$ is a GSM/GPRS network. Accordingly, communication between MAN 104 and AAN 102$_1$ is via GSM. Then, at step 110, MAN 104 receives a beacon/broadcast message via wireless channels from a different AAN (AAN 102$_2$), which allows MAN 104 to detect the availability of the AAN 102$_2$ network, at step 112. In the example, AAN 102$_2$ is a UMTS system. In response to the received beacon/broadcast message, MAN 104 transmits signals, at step 114, over the negotiator control channel to MAN negotiator 106 to initiate negotiations with AAN 102$_2$ in expectation of a possible roaming from AAN 102$_1$ to AAN 102$_2$. The signals transmitted to MAN negotiator 106 include the beacon/broadcast is messages received from AAN 102$_2$ that allow MAN negotiator 106 to identify AAN 102$_2$.

Next, at step 116, MAN negotiator 106 performs negotiations with AAN 102$_2$ to determine whether it is feasible for AAN 102$_2$ to handle wireless communications on behalf of MAN 104. In particular, MAN negotiator 106 relays AAA data as well as PDP (packet data protocol)-context information to AAN 102$_2$ for authenticating MAN 104 and establishing a trust relationship with AAN 102$_2$. The negotiations are performed pursuant to protocols and rules pre-stored within MAN negotiator 106 by MAN 104. All negotiation signalling between MAN negotiator 106 and AAN 102$_2$ is performed using the fixed communication links discussed above so as not to consume valuable wireless bandwidth. The results of the negotiations are then transmitted at step 118 from MAN negotiator 106 to MAN 104 over the negotiator control channel. In the example, the negotiations between MAN negotiator 106 and AAN 102$_2$ are successful and so a handover from AAN 102$_1$ to AAN 102$_2$ is then performed at step 120. MAN 104 is thereafter connected to AAN 102$_2$ and wireless communications involving MAN 104 are then transmitted via wireless channels using UMTS transmission protocols at step 122 until the network connection between the MAN 104 and ANN 102₂ is ultimately terminated at step 124.

Figure 3:
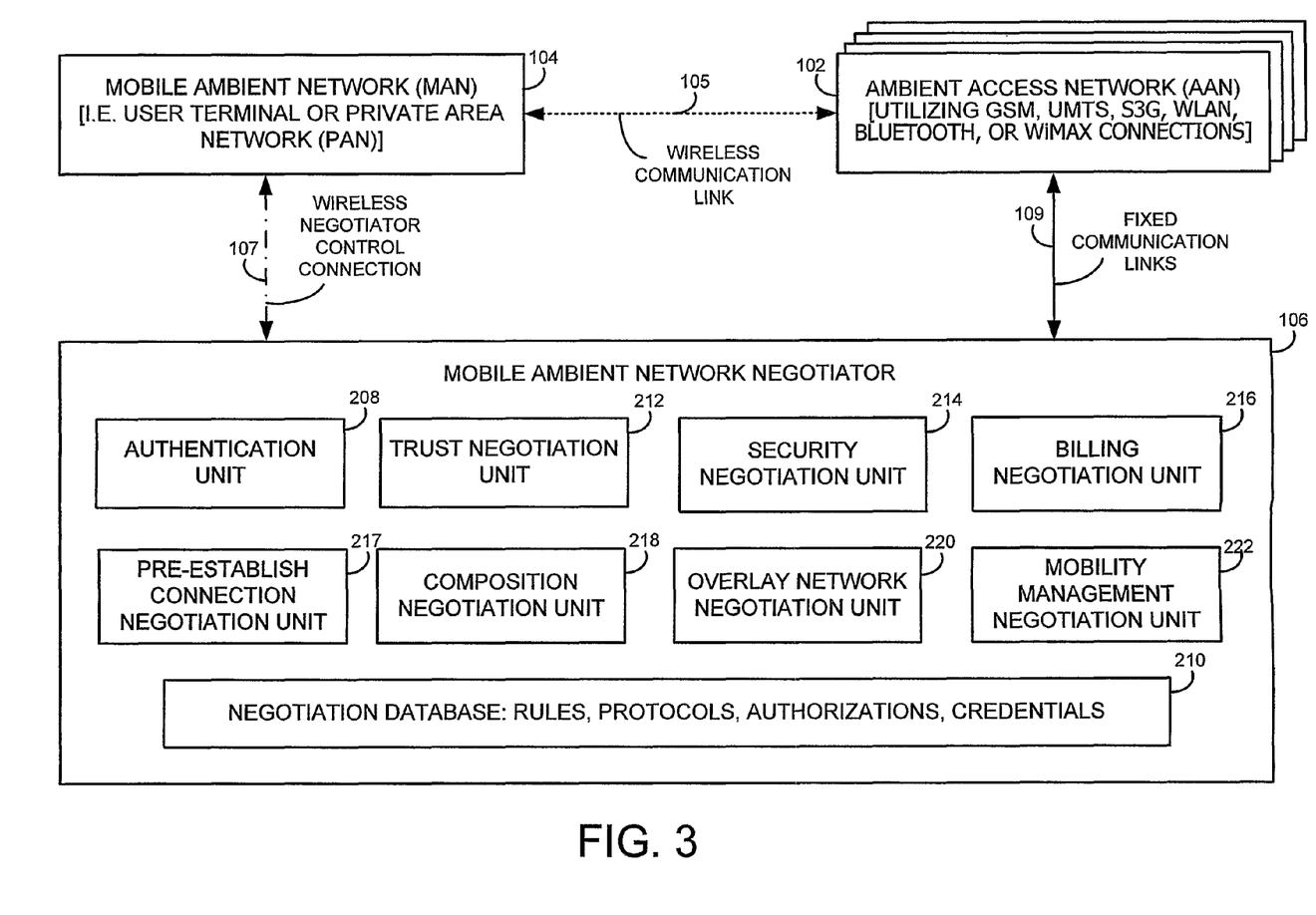
FIG. 3 illustrates selected components of the MAN negotiator of FIG. 1.

With reference to the block diagram of FIG. 3, the components of an exemplary implementation of MAN negotiator 106 of FIG. 1 and the operations performed by these components will now be described in further detail. It should be understood, however, that FIG. 3 illustrates just one example of a MAN negotiator 106. Other MAN negotiators 106 may be provided in accordance with the invention. MAN negotiator 106 may be a stand-alone component separate from the individual AANs 102 or may be implemented as a component of those networks. If implemented as a component of an AAN 102, MAN negotiator 106 may, for example, be incorporated within a mobile switching center (MSC) or the like. Moreover, depending upon the implementation, individual sub-functions or sub-components of MAN negotiator 106 may be distributed among various other devices.

MAN negotiator 106 includes an authentication unit 208 that operates to authenticate MAN 104 to any selected AAN 102. Authentication is preferably achieved by accessing AAA credentials pre-stored within a negotiation database 210. Preferably, any necessary credentials are stored within the database when the initial logical association between MAN 104 and MAN negotiator 106 is first established. These credentials may be updated by MAN 104 as needed. Thereafter, MAN negotiator 106 need not obtain credentials from MAN 104 prior to each negotiation, thereby reducing the amount of signaling required on negotiator control channel 107. To facilitate authentication, each AAN 102 is preferably provided with authenticated ports (i.e. IP entry ports such as a Gateway GPRS Support Node (GGSN) ports, wherein GPRS is the General Packet Radio Service) that MAN negotiator 106 can access via a fixed network connection 109. MAN negotiator 106 communicates with the AANs 102 via the authenticated ports in the same manner that a MAN would communicate with a RAT network via an Internet Service Provider (ISP).

Trust, security and billing negotiation units 212, 214 and 216, respectively, are provided to handle negotiations on behalf of the MAN pertaining to these particular aspects of service negotiation. Again, negotiation database 210 is accessed to obtain any information necessary to handle the negotiation on behalf of the MAN. In particular, protocols or rules may be pre-stored within the database that specify the scope or parameters of the negotiations. Insofar as billing is concerned, for example, the database may store rules specifying the maximum amount that the user of the MAN is willing to pay for any particular service. The user may further specify particular operators that are preferred (i.e. a "white list"), as well as (or in the alternative) any operators that are forbidden (i.e. a "black list"). This information is stored within the database 210 and utilized by MAN negotiator 106 during selection of an AAN 102 on behalf of the user.

In some situations, it may be appropriate to pre-establish a connection between MAN 104 and a particular AAN 102, e.g. MAN negotiator 106 performs negotiations with a particular AAN 102 before MAN 104 even enters the access region of the AAN 102. This may be appropriate, for example, if MAN 104 is roaming. Based on the direction or trajectory of MAN 104, MAN negotiator 106 predicts the AANs 102 that MAN 104 will come into communication contact with. A pre-establish connection negotiation unit 217 is provided to identify those AANs 102 and to initiate negotiations on behalf of MAN 104 so that, once the MAN 104 eventually enters the communication region of AAN 102, the handover to the AAN 102 may be performed immediately without requiring any further negotiations and time delays. In one example, for a 2G/3G AAN, this may be implemented to establish a PDP context, Radio Access Bearer, Radio Bearer, etc. In general, all non-access stratum signaling may be performed by the MAN negotiator 106.

A composition negotiation unit 218 is provided to coordinate any negotiations pertaining to the composition of other ambient networks, such as service negotiations, compensation/billing negotiations as well as negotiations regarding how resources may be used or shared. For example, circumstances may arise where MAN negotiator 106 needs to negotiate a roaming agreement between a pair of AANs 102 so as to facilitate a roaming of MAN 104 from one to the other. Insofar as overlay networks are concerned, an overlay network negotiation unit 220 is provided that coordinates negotiations with any overlay networks. For example, MAN negotiator 106 may signal the capabilities of MAN 104, its service requirements, preferences and policies, etc., to any overlay nodes. A mobility management negotiator unit 222 is provided that implements mobility management procedures on behalf of MAN 104, such as performing mobile IP binding updates with any security procedures required to validate to other network nodes that this procedure is authenticated.

Figure 4:
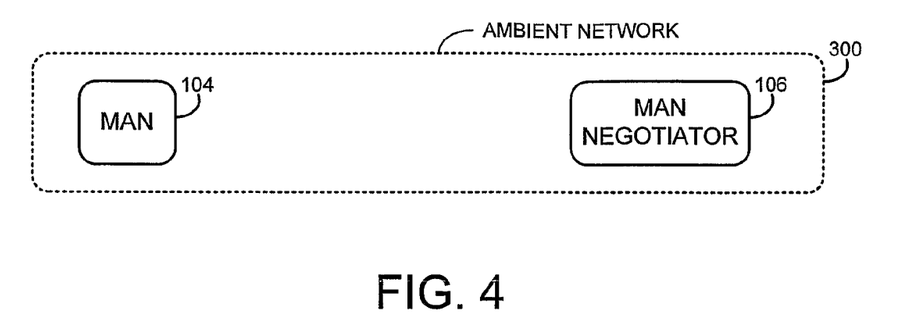
FIG. 4 illustrates an implementation wherein the MAN and MAN negotiator form a single ambient network.
Figure 5:
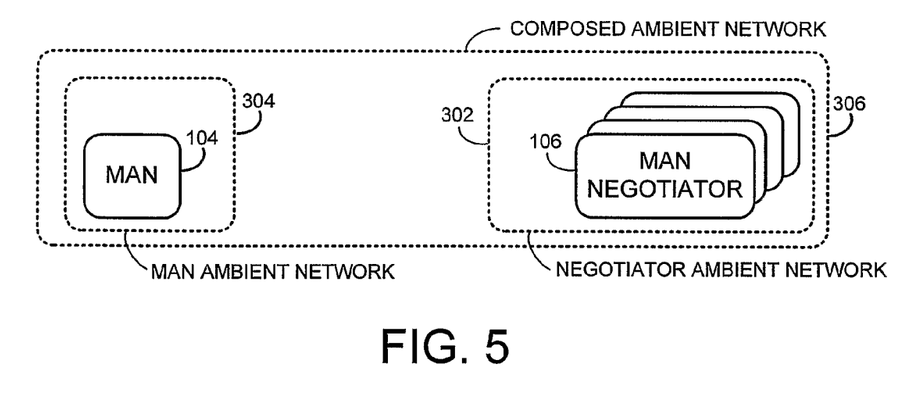
FIG. 5 illustrates an implementation wherein the MAN and a set of MAN negotiators form a composed ambient network.

Turning now to FIGS. 4 and 5, two general scenarios for implementing a MAN and MAN negotiator arrangement will briefly be discussed. In the first scenario of FIG. 4, there is a one-to-one logical relationship between MAN 104 and MAN negotiator 106, which collectively form a single ambient network 300. The individual components of MAN 104 and MAN negotiator 106, however, are at different locations, i.e. the MAN negotiator 106 is at a fixed location (with better connectivity), whereas the MAN 104 is mobile. With this implementation, MAN negotiator 106 may be distributed over a number of different nodes, which may be at different locations. In the second scenario of FIG. 5, a set of MAN negotiators 106 collectively form a negotiator ambient network 302. A set of MANs 104, only one of which is shown in tiator ambient network 302. A set of MANs 104, only one of which is shown in FIG. 5, forms a MAN ambient network 304. Collectively, negotiator ambient network 302 and MAN ambient network 304 form a composed ambient network 306. Hence, in the scenario FIG. 5, the MAN negotiator 106 is part of a different ambient network from the MAN 104. The association of the MAN 104 with its corresponding MAN negotiator 106 is achieved, for example, using otherwise conventional network composition techniques implemented between these networks. The MAN negotiator 106 might be, for example, located in a home network or in an Access Broker network.

What have been described are various exemplary techniques for implementing a MAN negotiator. While the invention has been described with respect to particular embodiments, those skilled in the art will recognize that the invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A network component for use within a multi-operator wireless communication system having a plurality of wireless communication networks and at least one mobile ambient network (MAN), which includes at least one user terminal, the network component comprising:
   a MAN negotiator assigned to a particular MAN and operative to communicate with one or more of the wireless communication networks on behalf of the MAN via a non-wireless connection to select a particular wireless communication network to handle a wireless communication session of the MAN and to enable an establishment of a wireless connection between the particular wireless communication network and the MAN, wherein the establishment of the wireless connection comprises an establishment of a security association, an establishment of a billing relationship, a negotiation of services, or a negotiation for sharing resources, wherein the MAN negotiator is operative to communicate with the MAN via at least one of a secure and a trusted connection via a wireless communication link, and the MAN negotiator is controllable by the MAN via a dedicated control channel.

2. The network component of claim 1, wherein the MAN negotiator is operative to communicate with the wireless communication networks via an authenticated port using the non-wireless connection.

3. The network component of claim 1, wherein the MAN negotiator is responsive to commands received from the MAN pertaining to negotiations with wireless communication networks.

4. The network component of claim 1, wherein the MAN negotiator, is operative to authenticate the MAN with a wireless communication network using, preferably, a pre-stored Authentication, Authorization, Accounting credential.

5. The network component of claim 1, wherein the MAN negotiator is operative to negotiate with a wireless communication network on behalf of the MAN with regard to one or more of:
    trust establishment, security association establishment, and billing establishment.

6. The network component of claim 1, wherein the MAN negotiator is operative to negotiate with a wireless communication network on behalf of the MAN with regard to mobility management procedures.

7. The network component of claim 1, wherein the MAN negotiator is operative to negotiate with a wireless communication network on behalf of the MAN with regard to pre-establishing connections for the MAN.

8. The network component of claim 7, wherein the MAN negotiator is operative to negotiate with the wireless communication network on behalf of the MAN to pre-establish connections to one or more access ambient networks of the wireless communication network.

9. The network component of claim 8, wherein the MAN negotiator is operative to negotiate with the wireless communication network on behalf of the MAN to pre-establish connections to an AAN prior to the MAN establishing a direct link to the AAN.

10. The network component of claim 1, wherein the MAN negotiator and the MAN form a single ambient network.

11. The network component of claim 1, wherein a plurality of MAN negotiators are provided forming a negotiator ambient network.

12. A method for use by a mobile ambient network negotiator component of a multi-operator wireless communication system having a plurality of wireless communication networks and at least one mobile ambient network (MAN), which includes at least one user terminal, the method comprising the steps of:
    receiving commands via a dedicated channel from a MAN to which the MAN negotiator is assigned; and
    communicating with one or more of the wireless communication networks on behalf of the MAN via a non-wireless connection to enable an establishment of a wireless connection between a selected wireless communication network and the MAN, wherein the establishment of the wireless connection comprises an establishment of a wireless connection, an establishment of a billing relationship, a negotiation of services, or a negotiation for sharing resources, wherein
    the commands are received from the MAN via a wireless communication link via at least one of a secure and a trusted connection and pertain to the selection of a wireless communication network to handle a wireless communication session of the MAN.

* * * * *

UNITED STATES PATENT AND TRADEMARK OFFICE
CERTIFICATE OF CORRECTION

PATENT NO. : 8,010,150 B2  
APPLICATION NO. : 11/917078  
DATED : August 30, 2011  
INVENTOR(S) : Magnusson et al.

Page 1 of 1

It is certified that error appears in the above-identified patent and that said Letters Patent is hereby corrected as shown below:

In Column 4, Line 36, delete "MANs" and insert -- AANs --, therefor.

In Column 4, Line 36, delete "MANs 102" and insert -- AANs 102 --, therefor.

In Column 4, Lines 42-43, delete "MANs 102, the MANs 102" and insert -- AANs 102, the AANs 102 --, therefor.

In Column 4, Line 47, delete "MANs" and insert -- AANs --, therefor.

In Column 4, Line 52, delete "MANs" and insert -- AANs --, therefor.

In Column 4, Line 54, delete "MAN to another MAN," and insert -- AAN to another AAN, --, therefor.

In Column 4, Line 57, delete "MANs" and insert -- AANs --, therefor.

In Column 4, Line 58, delete "MAN $102_5$)" and insert -- AAN $102_5$) --, therefor.

In Column 4, Line 58, delete "other MANs" and insert -- other AANs --, therefor.

In Column 4, Line 60, delete "MAN" and insert -- AAN --, therefor.

In Column 6, Line 47, delete "is messages" and insert -- messages --, therefor.

In Column 8, Line 38, delete "tiator" and insert -- negotiator --, therefor.

Signed and Sealed this  
Ninth Day of October, 2012

David J. Kappos  
*Director of the United States Patent and Trademark Office*